United States Patent [19]

Ottemann

[11] Patent Number: 4,667,934

[45] Date of Patent: May 26, 1987

[54] MULTI-SPEED WINCH

[75] Inventor: William C. Ottemann, Menlo Park, Calif.

[73] Assignee: Barient, Inc., Santa Ana, Calif.

[21] Appl. No.: 819,920

[22] Filed: Jan. 16, 1986

[51] Int. Cl.[4] .......................... B66D 1/20; B66D 1/22; F16H 5/72

[52] U.S. Cl. ........................................ 254/344; 74/682; 74/812; 254/348; 254/358

[58] Field of Search ............... 254/342, 344, 345, 346, 254/348, 354, 355, 357, 358, 365, 370; 74/812, 682

[56] References Cited

U.S. PATENT DOCUMENTS

| | | | |
|---|---|---|---|
| Re. 30,423 | 10/1980 | Hutton et al. | 254/346 |
| Re. 30,881 | 3/1982 | Huggett et al. | 254/345 |
| 3,145,974 | 8/1964 | Short | 254/323 |
| 3,670,589 | 6/1972 | Carter | 254/354 X |
| 3,728,914 | 4/1973 | Guangorena et al. | 254/354 X |
| 3,802,665 | 4/1974 | Fawcett | 254/354 |
| 3,927,580 | 12/1975 | Fawcett | 254/344 X |
| 3,942,762 | 3/1976 | Reymond | 254/345 X |
| 3,981,208 | 9/1976 | Moses | 74/812 |
| 4,054,266 | 10/1977 | Guangorena | 254/345 |

*Primary Examiner*—Stuart S. Levy
*Assistant Examiner*—Joseph J. Hail, III
*Attorney, Agent, or Firm*—Karl A. Limbach

[57] ABSTRACT

A three speed winch has two alternative inputs. The first input shifts the winch between first, second and third gear trains by successive reversals of the direction of an input member. The alternative input drives the winch at two different speeds responsive to rotation of an input member in opposite directions. The alternative input may be connected to drive the winch in either first or third gear so that the winch provides seven gear ratios. There are four pairs of gear ratios available by simple reversal of direction of an input, and the winch has three different ratios between the gear ratios of the different pairs.

5 Claims, 12 Drawing Figures

MULTI-SPEED WINCH

BACKGROUND OF INVENTION

One of the features which has become very popular in sailboat winches is the ability to shift the winch between different gear ratios simply by reversing the direction of rotation of an input member. The input member may be a winch handle which rotates a shaft or a crank mechanism which many crew members operate together to provide very high power to a single shaft.

An early two speed winch which shifts by reversal is shown in U.S. Pat. No. 3,145,974.

Three speed winches have been developed in which shifting is accomplished between both first and second and between second and third by reversal of an input. U.S. Pat. Nos. 3,728,914, 3,927,580, and 4,054,266, show such three speed winches in which the winch cascades through all three gears simply by two consecutive reversals.

Some three speed winches also have the ability to hold the winch in different conditions where the operator can select a pair of gears which are available alternately upon input reversal. U.S. Pat. No. 3,802,665 shows such a winch with a shift lever to select the availability of first and second or second and third.

Some winches have combinations of these features. For instance, U.S. Pat. No. Re. 30,881 and a winch installed on the twelve meter yacht American Eagle included both cascading through three gears on successive reversals and the ability to be operated in either the highest pair or the lowest pair of gear ratios depending on the position of a manual selector. The American Eagle winch has four gears with operation possible in first and second, third and fourth or second, third and fourth.

These winches have also been provided with devices known as range boxes which are manual gear shift mechanisms which are connected in series with a given winch to permit the winch to be operated in either a high range or a low range. A three speed winch with a two speed range box provides six available gear ratios.

One of the restraints which has confined the winch designer is the problem of providing winches with several pairs of gear ratios where the ratio between the gear ratios was different for different pairs. For instance, the designer might provide a three speed winch with gear ratios of 2:1 in first, 6:1 in second, and 24:1 in third. When this winch is operated in the first pair of gear ratios (first and second) for downwind work, the ratio between the gear ratios is 3:1, and when the winch is operated using the final second-third pair for up-wind work, the ratio between the two gear ratios is 4:1.

The designer can put a 1:2 range box in series with the winch to convert the winch for use in light air, and this would change the gear ratios to 1:1 in first, 3:1 in second, and 12:1 in third. However, the ratios between the gear ratios of the high pair and the final pair remain the same, 3:1 and 4:1, and this may be undesirable. For instance it may be desirable to have first gear raised to 1:1 for fast response with a spinnaker, but the 3:1 gear ratio paired with it may not be strong enough and the designer would rather have 5:1. It can't be done with a range box.

SUMMARY OF INVENTION

This problem can be solved with a winch which has a first set of gear trains between which an operator can select by reversal of the direction of rotation of an input member where two of the gear trains in the set have a predetermined relation between their output speeds for a given speed of the input member. The winch also has a selectable alternative input for driving the winch when the winch is in at least one of the gear trains of the first set, and the alternative input has an output member for driving the gear train in one direction of rotation at two different speeds in response to rotation of an input member in opposite directions of rotation. The two different output speeds of the alternate input have a different relation between each other for a given input speed of the alternative input member than the predetermined relation of the two gear trains of the first set. As a result the winch operator is able to select two different modes of operation in which two different gear ratios are available by reversal of an input, and the ratio between the two gear ratios is different in the two modes.

When this technique is used in a winch having at least three speeds, the alternative input can operate in first and third gear where the input direction is the same with the result that instead of getting six gear ratios that is possible with a range box, there are seven gear ratios available and the seven ratios include four pairs that can have three different ratios of gear ratios.

For instance, in the example given above the designer can provide an alternative input in first and third gear having an output of 1:2 cranked to the right and 5:2 cranked to the left. The alternative input into first gear will then give an output of 1:1 cranked to the right and 5:1 cranked to the left. The designer gets the desired result.

The designer also gets a new pair of gears available with the alternative input into third gear. Here the 1:2 and 5:2 alternative input into third will provide (24:1 times 1:2 and 5:2) 12:1 cranked to the right and 60:1 cranked to the left. This extra benefit is also a valuable one too. When the winch is operated with its regular input through first, second, and third, the operator will have the regular 2:1, 6:1 and 24:1 gears for up-wind work with the full crew and also a final gear of 60:1 for fine trim by one crewman. The 12:1 gear is also valuable. If a gust of wind hits while the crew is using the alternative input at 1:1 and 5:1 in first gear, dropping the winch into third gear gives the extra power of 12:1.

This invention may be used in the type of drive linkages which have been used with range boxes, where for instance, shifting is accomplished by shifting a dog clutch between different diameter sprockets. The invention can also be used in more integrated structures where shifting is accomplished with an axially movable gear or a swinging gear.

DETAILED DESCRIPTION OF THE PREFERRED EMBODIMENT

Figure 1:
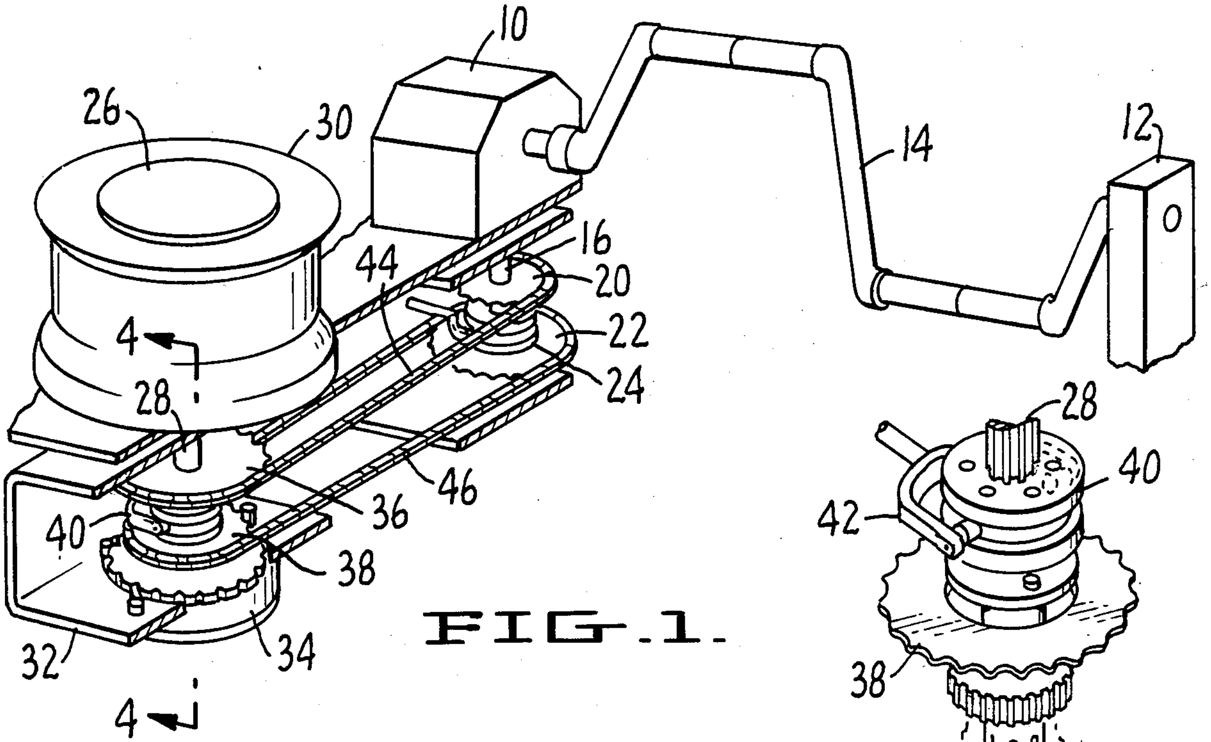
FIG. 1 is a perspective view of a winch mechanism constructed in accordance with this invention.
Figure 2:
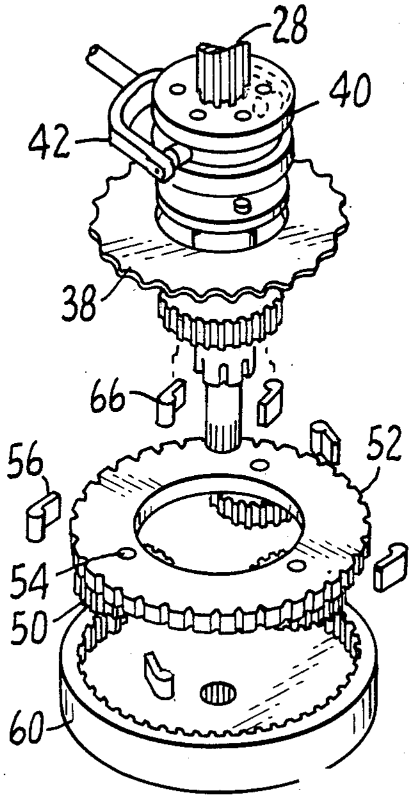
FIG. 2 is an enlarged view of a portion of the mechanism of FIG. 1.
Figure 3:
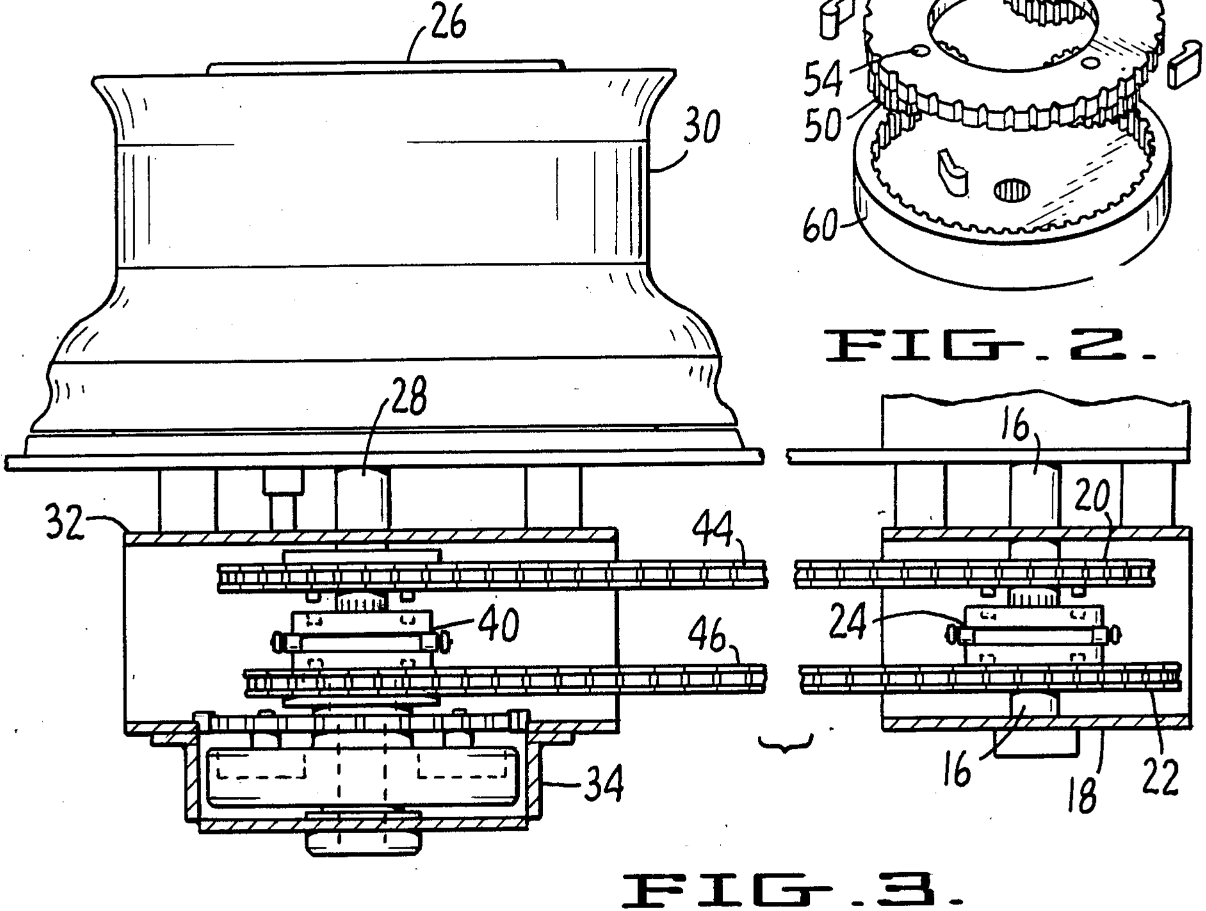
FIG. 3 is an enlarged view of a portion of the structure of FIG. 2.

Referring now in detail to the drawings, and particularly to FIG. 1, the winch structure shown therein includes a pair of pedestals 10 and 12 supporting a multi-operator crank 14. The pedestal 10 carries a bevel gear connecting the crank 14 to a vertical shaft 16, which is journaled in a suitable frame 18 below the pedestal 10. A pair of sprockets 20 and 22 are rotatably mounted on the shaft 16 and a dog clutch 24 is splined to the shaft 16 and movable between the sprockets 20 and 22.

A three speed winch 26 is mounted adjacent to the pedestal 10 with a bottom input shaft 28. The winch 26 is constructed in accordance with the design of U.S. Pat. No. 4,054,266 so that the winch drum 30 operates unidirectionally (clockwise) at three different speeds in response to operation to the input shaft 28 at one speed. Thus, the internal mechanism of the winch 26 has first, second and third gear trains of progressively increasing gear ratios and the mechanism shifts from first to second upon a first reversal of direction of rotation of the shaft 28 and shifts from second to third upon a second reversal of direction of rotation of the shaft 28.

Mounted below the winch 26 is a frame 32 supporting the shaft 28 with a planetary gear box 34. A pair of sprockets 36 and 38 are rotatably mounted on the shaft 28, and a dog clutch 40 is splined to the shaft 28 and movable by a yoke 42 to upper and lower positions where it alternately connects the shaft 28 to the sprockets 36 and 38.

The dog clutches 24 and 40 are connected together (by means not shown) to operate simultaneously so that the two dog clutches are both either in the upper positions or the lower positions.

The sprocket 20 is connected to the sprocket 36 by a chain 44 and the sprocket 22 is connected to the sprocket 38 by a chain 46. When the dog clutches 24 and 40 are in their upper positions, drive force is transmitted from the crank 14 through the shaft 16, the dog clutch 24, sprocket 20, chain 44, sprocket 36 and dog clutch 40 to the bottom input shaft 28 of the winch 26 so that the winch is operated in its normal three speed mode as disclosed in the '266 patent. As indicated above, the winch may be provided with a hold in first modification so that the winch operates either in the sequence first, second, third, second, third upon consecutive reversals or in the mode of first, second, first, second upon subsequent reversals.

Figure 5:
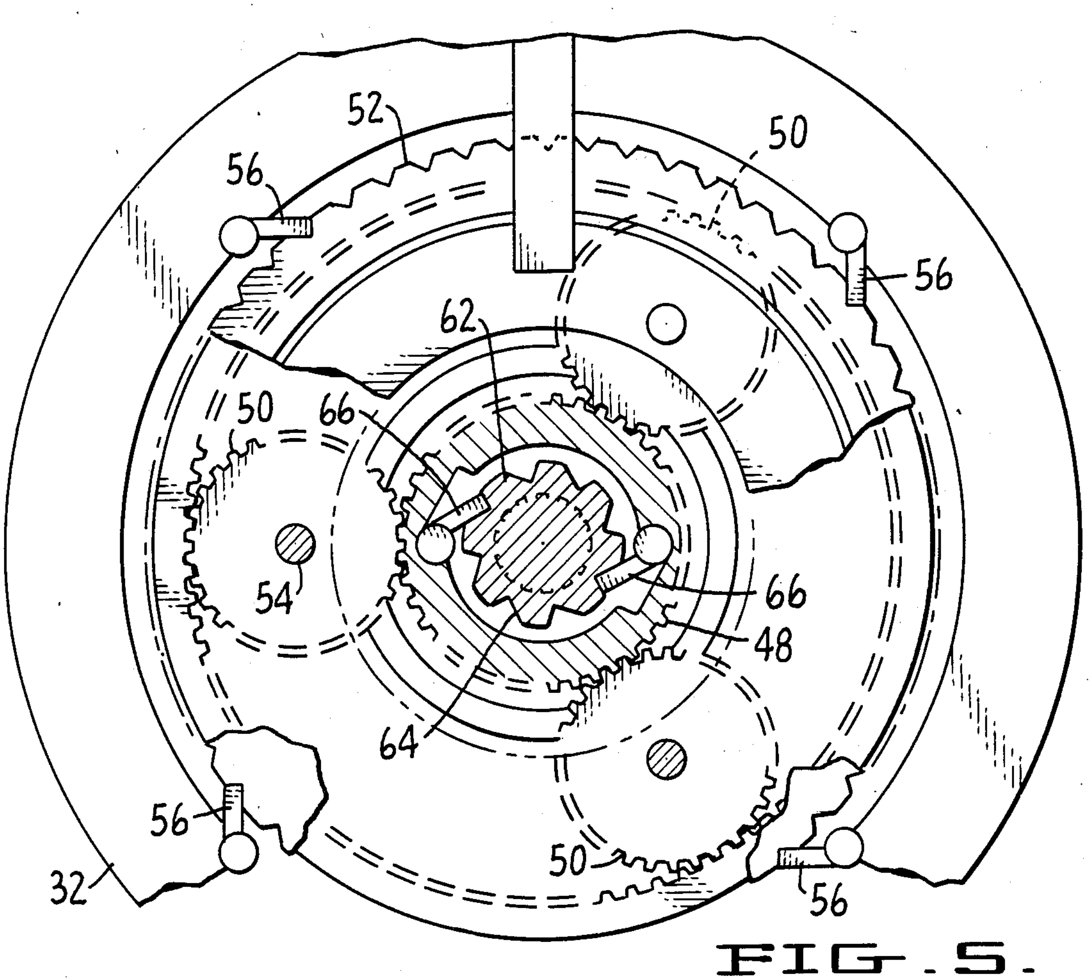
FIG. 5 is a sectional view taken through the structure of FIG. 4 on the plane indicated at 5—5 in FIG. 4.
Figure 4:
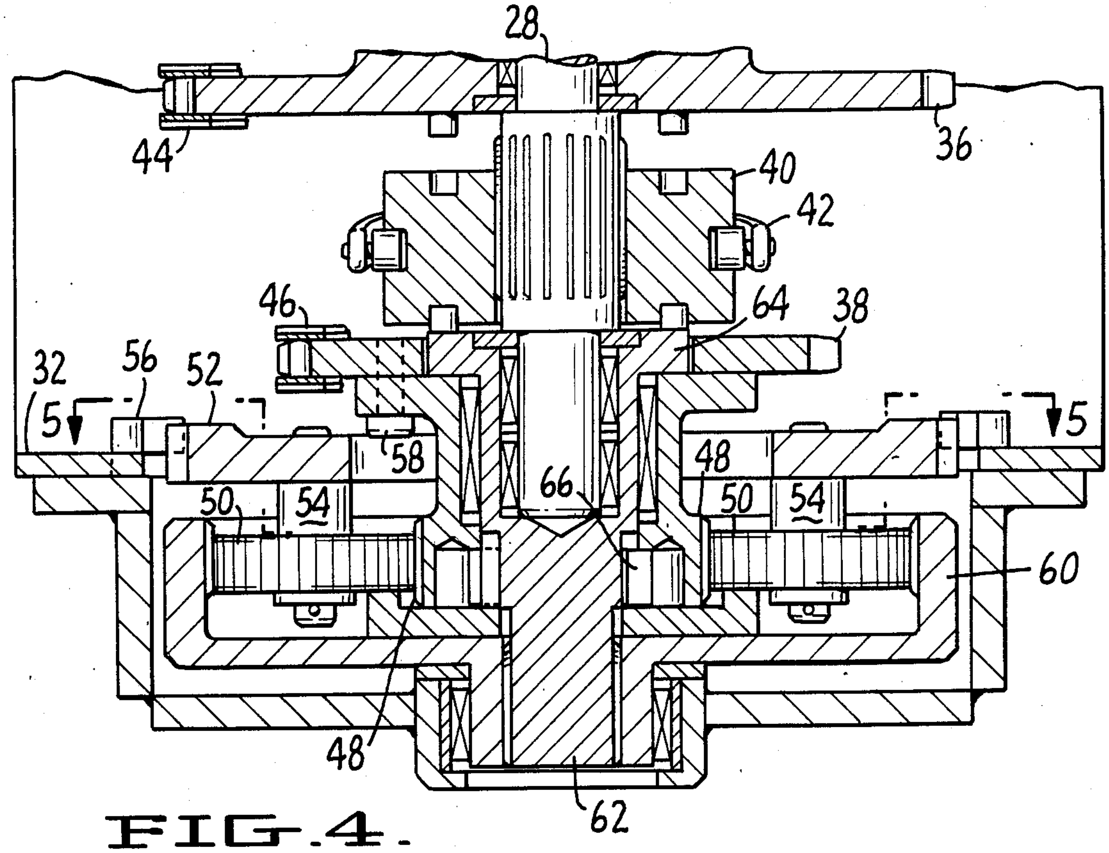
FIG. 4 is a sectional view taken through the structure of FIG. 1 on the plane indicated at 4—4.

With dog clutches 24 and 40 in their lower positions, an auxiliary input is provided to the shaft 24 through the planetary gear box 34. With reference to FIGS. 4 and 5, the planetary gear box includes a sun gear 48 and three planet gears 50, and the planet gears are mounted on a planet carrier 52 by shafts 54, and the periphery of the carrier 52 is connected to the frame 32 by ratchet dogs 56. Thus, the planet carrier can rotate clockwise with respect to the frame, but the ratchet dogs 56 prevent it from rotating counterclockwise with respect to the frame. The sun gear is connected to the lower sprocket 38 by bolts 58.

A ring gear 60 is splined to shaft 62 which forms the lower end of the hub 64 of sprocket 38, as illustrated in FIG. 4. The hub 64 drives the sun gear 48 by means of dogs 66 inside the sun gear.

When the dog clutches 24 and 40 are in their lower positions, and the sprocket 38 is driven clockwise, the ratchet dogs 66 in the sun gear drive the lower shaft 62 clockwise which in turn drives the shaft 28 clockwise through dog clutch 40, and the input shaft 28 to the winch drum operates at the same speed as the sprocket 38. The relative gear ratios between this drive speed and the drive speed which is obtained with the dog clutches 24 and 48 in their upper positions is determined by selection of the number of teeth on the sprockets.

When the sprocket 38 is driven counterclockwise, it drives the sun gear 48 counterclockwise, and the ratchet dogs 66 slip over the notches 64 so that there is no direct drive to the lower shaft 62. Instead, the sun gear 48 drives the planet gears 50 clockwise which in turn drive the ring gear 60 clockwise so that the lower shaft 62, dog clutch 40 and shaft 28 are driven clockwise but at a substantially slower speed determined by the gear reduction of the planetary gear train.

It should be noted that when the sprocket is driven clockwise, it drives the entire planetary system, including the ring gear 60 and carrier 52 clockwise while the ratchet dogs 56 slip in the notches on the periphery of the carrier 52, but when the sprocket 38 is driven counterclockwise the ratchet dogs 56 hold the planet carrier 52 stationary.

It will be noted that the auxiliary input provides an output which is unidirectional at two different gear ratios in response to inputs at the sprocket 38 in opposite directions, and the ratio between these two gear ratios can be selected by selection of the planetary gear train independently of the gear ratios in the winch 26. The winch 26 is designed so that its first and third speeds are used when the input shaft is operated clockwise. Accordingly, the auxiliary input will provide two different pairs of gear ratios depending upon whether the winch 26 is in first or third gear.

Figure 6:
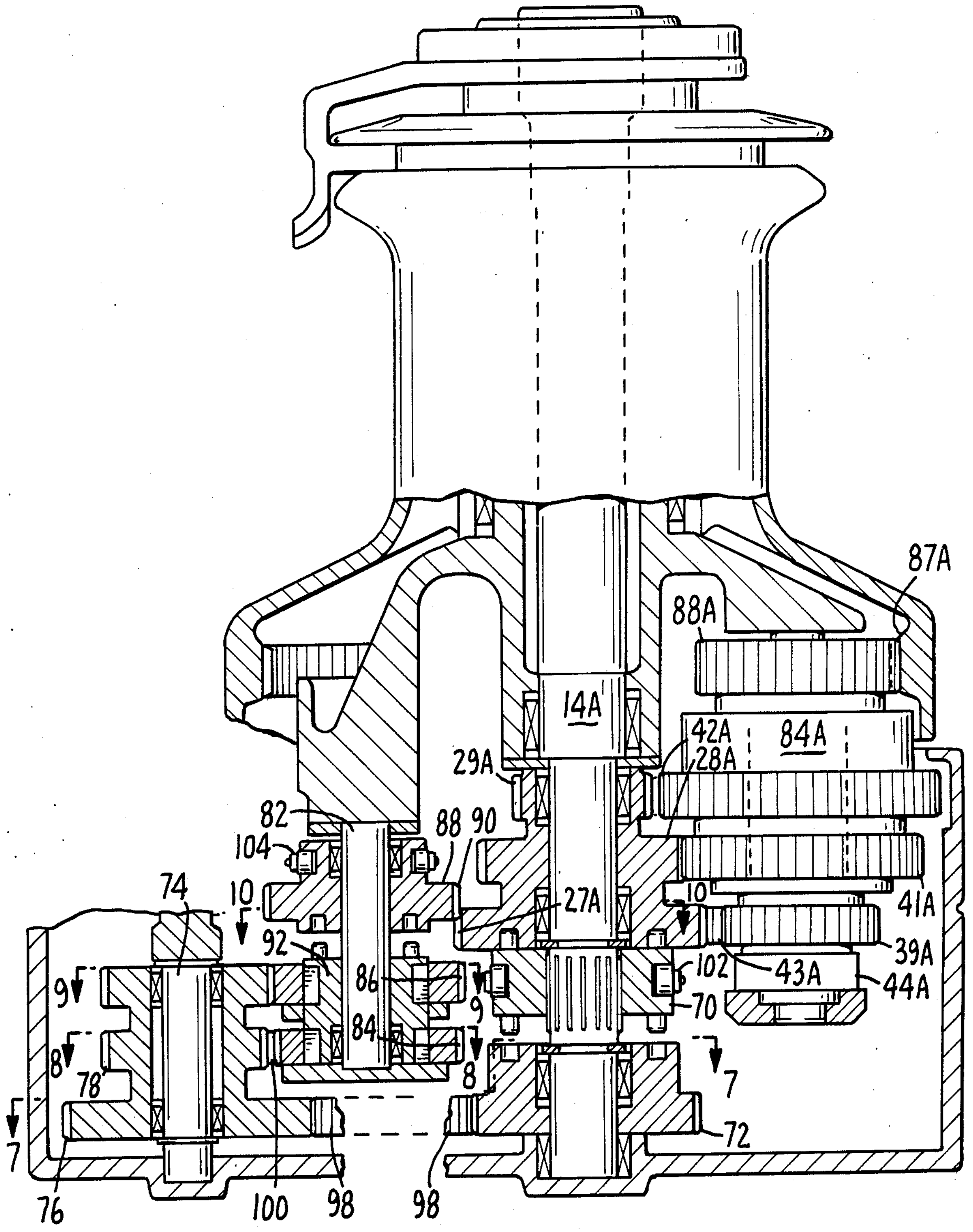
FIG. 6 is an elevational view partially in vertical section of an alternative form of winch constructed in accordance with the principles of this invention and in which several of the vertical shafts have been rotated to a position where they can be viewed on a single plane. The true location of the shafts is indicated in FIG. 11.
Figure 10:
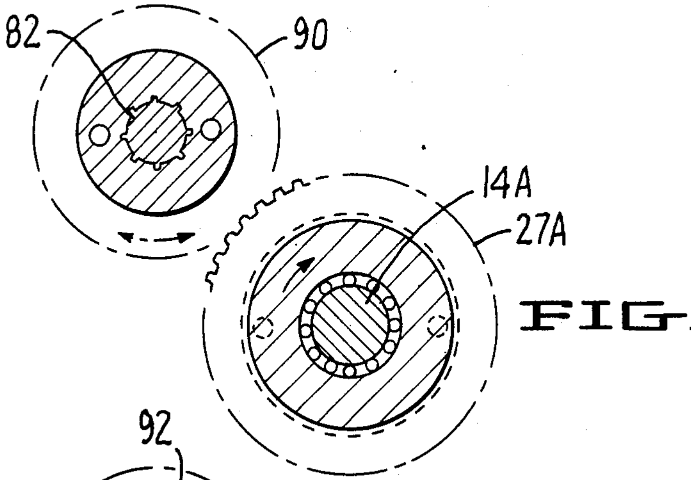
FIG. 10 is a sectional view taken on the plane indicated at 10—10 in FIG. 6 and showing the output gears of the auxiliary input means.
Figure 11:
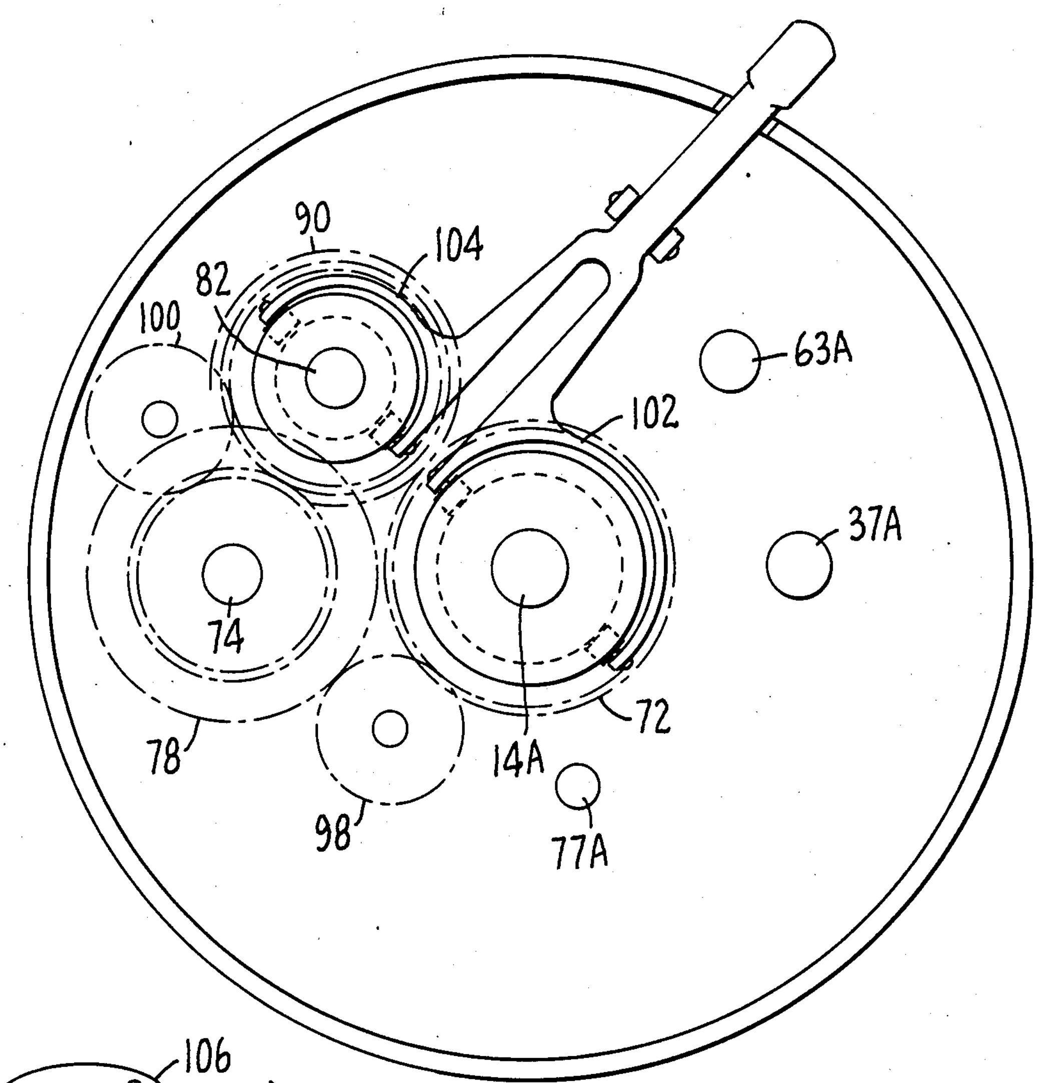
FIG. 11 is a cross sectional view through the winch of FIG. 6 showing the true arrangement of shafts in the winch.

Referring now in detail to FIG. 6, the winch illustrated therein contains the structure of the winch shown in the '266 patent modified to provide the structure of this invention in a single winch housing. The parts in FIGS. 6–11 which are similar to the parts shown in the '266 patent are given similar numbers with an added letter A. Additionally, some of the parts illustrated in greater detail in the '266 patent are not shown in FIGS. 6–11 for simplicity. Thus, it will be apparent from an examination of the '266 patent that the carrier 44A shown in FIG. 6 supports a shaft 63A (FIG. 11) which carries a pinion illustrated at 43 in the '266 patent for connecting gear 39A to gear 27A in first gear. Similarly, a pinion is provided on shaft 77A for connecting gear 29A to gear 42A in third gear.

The winch shown in FIGS. 6–11 has been modified from the structure shown in the '266 patent by providing a dog clutch 70 splined to the shaft 14A and movable between an upper position engaging the gear 27A and a lower position engaging a gear 72 which is free to rotate on the shaft 14A. With dog clutch 70 in its upper position the winch operates as shown and described in the '266 patent.

Figure 9:
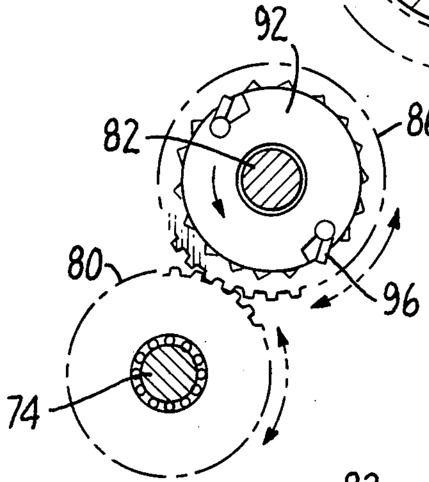
FIG. 9 is a sectional view taken on the plane at 9—9 in FIG. 6 and showing the higher speed gear train of the auxiliary input means.
Figure 8:
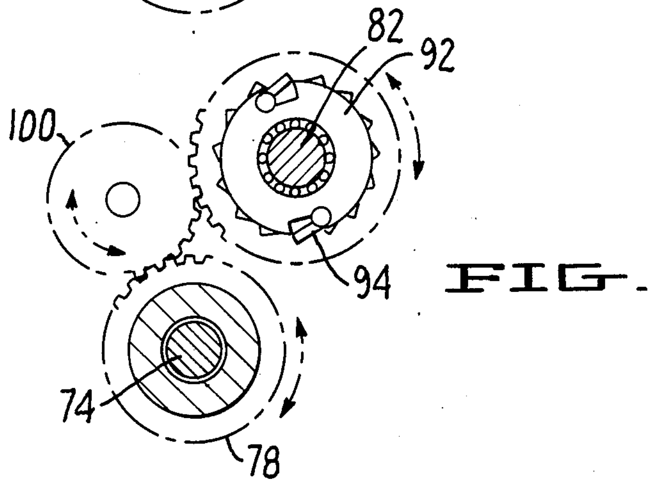
FIG. 8 is a sectional view taken on the plane indicated at 8—8 in FIG. 6 and showing the lower speed gear train of the auxiliary input means.
Figure 7:
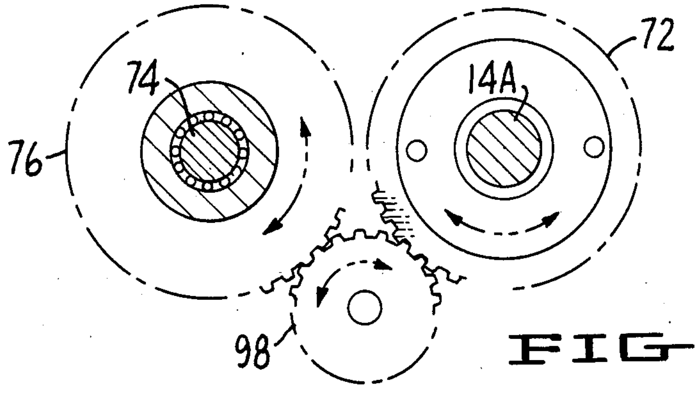
FIG. 7 is a sectional view along the plane indicated at 7—7 in FIG. 6 showing the input gears of the auxiliary input means.

A shaft 74 is mounted parallel to the shaft 14A and carries three gears 76, 78 and 80. A second shaft 82 is mounted parallel to the shaft 14 carrying a pair of gears 84 and 86 and an auxiliary movable dog clutch 88, the periphery of which carries a gear 90 engaging the gear 27A. When the dog clutch 88 is in its lower position, the gear 88 is connected to the center sleeve 92 of the gears 84 and 86, and ratchets 94 and 96 are provided for connecting a hub 92 to the gears 84 and 86 as shown in FIGS. 8 and 9. An idler gear 98 engages gears 72 and 76, and an idler gear 100 engages gears 78 and 84.

A pair of yokes 102 and 104 are connected for moving the dog clutches 70 and 88 up and down, and preferably the two yokes are connected together for unitary operation.

When the dog clutches 70 and 88 are in their lower positions, rotation of the drive shaft 14A does not drive gear 27A directly because gear 27A is disconnected from dog clutch 70. Instead dog clutch 70 drives gear 72 through idler 98 to gear 76. Gear 76 drives gears 78 and 80 which in turn operate through gears 84 and 86 to drive gear 90, and gear 90 is always driven counterclockwise by ratchets 94 and 96. When gear 78 is driven counterclockwise, it drives gear 100 clockwise and gear 84 counterclockwise which in turn drives hub 92 and gear 90 counterclockwise. When gear 80 is driven clockwise, it drives gear 86 counterclockwise which in turn drives hub 92 and gear 90 counterclockwise.

Figure 12:
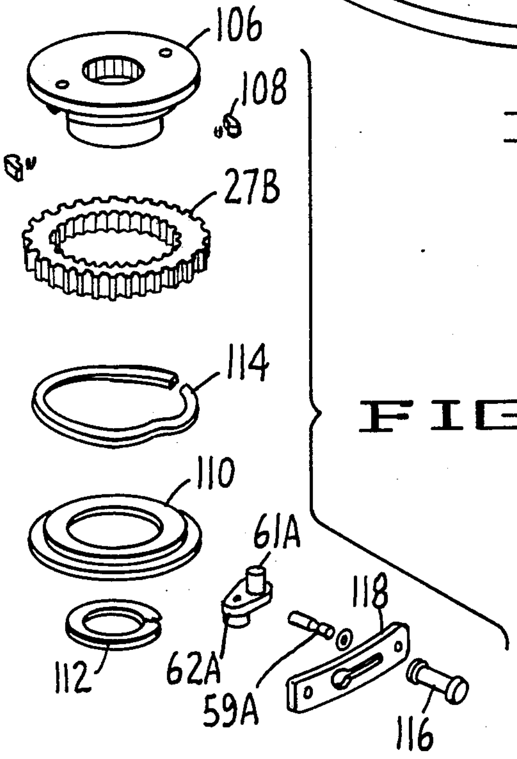
FIG. 12 is an exploded view showing an alternative modification of the structure of FIG. 6 which is used when the hold in first feature is incorporated into the winch.

The mechanism shown in FIG. 12 is used to replace gear 27A when hold in first is added as a feature of the winch. Here a gear carrier 106 is bolted to gear 28A and carries the gear 27A connected by ratchet dogs 108. A clamp ring 110, snap ring 112 and wave spring 114 hold gear 27B onto carrier 106. A latch 116 and latch plate 118 are provided on the shifting lever 59A of the three speed winch to hold it in first-second mode. The ratchet 108 slips to permit the winch to operate in second when the winch is latched in the first-second mode, and the wave spring 114 provides enough drag to shift the winch from first to third when the winch is not latched in the first-second mode. Where this feature is used the output gear 90 of the auxiliary input should be connected to gear 28A or 29A directly or through an idler instead of 27A so that the ratchet in 27A will not defeat operation of the auxiliary input in third gear.

I claim:

1. A winch having a drum mounted for unidirectional rotation and adapted to engage and pull a sheet as the drum rotates, a drive shaft mounted for rotation in both clockwise and counterclockwise senses of rotation, drive means interconnecting the shaft and drum for driving the drum unidirectionally in three different speeds of progressively different gear ratios with the first and third speeds operable in response to rotation of the drive shaft in one sense of rotation and second speed operable in response to rotation of the drive shaft in the other sense of rotation, and auxiliary input means connecting the drive shaft to said drive means for providing unidirectional input drive to the drive means in one of the senses of rotation in response to rotation of the drive shaft in both senses of rotation with the auxiliary input means having two different gear ratios operable in response to rotation of the drive shaft in the two different senses of rotation, and selector means for engaging and disengaging the auxiliary input means between the drive shaft and the three speed drive means.

2. The winch of claim 1 in which said auxiliary input means is connected to the drive means to drive the drive means in the sense of rotation in which the drive means operates in first and third gear whereby the auxiliary input means provides two different pairs of speeds depending upon whether the drive means is operating in first or third gear.

3. The winch of claim 1 in which the auxiliary input means has a pair of gear ratios, the ratio of which is different from the ratio between two of the adjacent gear ratios of the three speed drive means.

4. The winch of claim 1 having a first clutch for alternately connecting the drive shaft to the drum and the auxiliary input means and a second clutch for connecting or disconnecting the auxiliary input means and the drum.

5. The winch of claim 1 in which the drive means includes means for automatically shifting from first to second speed on a first reversal of input to the drive means and shifting from second speed to third speed on a second reversal.

* * * * *